United States Patent [19]
Kimble et al.

[11] Patent Number: 6,154,791
[45] Date of Patent: *Nov. 28, 2000

[54] COMMUNICATION SYSTEM FOR AN ARRAY OF DIRECT ACCESS STORAGE DEVICES (DASD) THAT PROVIDES FOR BYPASSING ONE OR MULTIPLE DASD

[75] Inventors: Christopher John Kimble, Pine Island; Thomas J. Osten, Rochester; Paul Gary Reuland, Rochester; Daniel Guy Young, Rochester, all of Minn.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/871,945

[22] Filed: Jun. 10, 1997

[51] Int. Cl.[7] ...................................................... G06F 11/30
[52] U.S. Cl. ............................. 710/19; 711/112; 710/10; 710/13
[58] Field of Search ..................................... 711/112, 114, 711/1, 2, 5, 115, 170, 171, 172, 173, 201; 395/858, 311, 830, 838, 281, 284, 833, 839

[56] References Cited

U.S. PATENT DOCUMENTS

| | | |
|---|---|---|
| 4,475,049 | 10/1984 | Smith et al. . |
| 5,099,137 | 3/1992 | Lattin, Jr. . |
| 5,239,559 | 8/1993 | Brach et al. . |
| 5,313,595 | 5/1994 | Lewis et al. . |
| 5,422,580 | 6/1995 | Mandel et al. . |
| 5,434,516 | 7/1995 | Kosco . |
| 5,467,453 | 11/1995 | Kocis . |
| 5,473,264 | 12/1995 | Mader et al. . |
| 5,546,017 | 8/1996 | Vitunic . |
| 5,632,027 | 5/1997 | Martin et al. ............................ 711/170 |
| 5,677,864 | 10/1997 | Chung ........................................ 365/63 |
| 5,706,472 | 1/1998 | Ruff et al. ................................ 711/173 |
| 5,729,763 | 3/1998 | Leshem ....................................... 710/38 |
| 5,768,551 | 6/1998 | Bleiweiss et al. ....................... 710/131 |
| 5,841,997 | 11/1998 | Bleiweiss et al. ....................... 710/131 |

OTHER PUBLICATIONS

"3–Mode Small Computer System Interface Terminator" by Isoda et al, IBM Technical Disclosure Bulletin, vol. 37, No. 11, Nov. 1994, pp. 315–316.

*Primary Examiner*—B. James Peikari
*Attorney, Agent, or Firm*—Gary D. Yacura; Birch, Stewart, Kolasch & Birch

[57] ABSTRACT

A communication system for an array of DASD includes a plurality of loop resiliency circuits and a plurality of selection circuits. The DASD array includes a plurality of DASD slots. Each DASD slot may receive a DASD, and each DASD receives power from a regulator. The loop resiliency circuits form at least a first communication path. Each loop resiliency circuit is associated with one of the DASD slots and selectively includes the associated DASD slot in the first communication path based on a selection signal. The plurality of selection circuits are also associated with one of the DASD slots; and therefore, are also associated with one of the plurality of loop resiliency circuits. Each selection circuit is connected to the associated DASD slot and receives output from the regulator in the associated DASD slot. Based on the regulator output, or a lack thereof, the selection circuit generates a selection signal for the associated loop resiliency circuit. Besides being serially connected to form a single communication path, the loop resiliency circuits can be divided into groups wherein the loop resiliency circuits in each group are serially connected to form a communication path. Separate loop resiliency circuits then selectively connect these communication paths to a main communication path including an initiator. As a further alternative, a second initiator can be selectively placed in one of the communication paths via another loop resiliency circuit.

17 Claims, 5 Drawing Sheets

COMMUNICATION SYSTEM FOR AN ARRAY OF DIRECT ACCESS STORAGE DEVICES (DASD) THAT PROVIDES FOR BYPASSING ONE OR MULTIPLE DASD

BACKGROUND OF THE INVENTION

1. Field of the Invention

The present invention relates to a communication system for an array of direct access storage devices or DASD; and more particularly, a communication system which provides for bypassing one and/or multiple DASD.

2. Description of Related Art

SCSI buses such as in a serial storage architecture SSA are normally wired in a loop configuration. Specifically, the four wire, two differential pairs, full duplex cable is wired into a DASD port 1, through the DASD, out the DASD port 2, and on to the next DASD. The originating end of the cable comes from an SSA DASD controller card or initiator, and returns via the last DASD in the loop or communication path to the initiator.

FIG. 1 illustrates such a prior art communication system for an array of DASD. As shown in FIG. 1, a computer 81 includes an operating system 82 in communication with an initiator 80. The communication system also includes a DASD array 86 of DASD slots 88. The DASD slots 88 are daisy-chained with the first DASD slot 88 and the last DASD slot 88 connected to two different ports of the initiator 80 to form a communication path. The operating system 82 also communicates with each DASD slot 88 via a network 84.

Each DASD slot 88 includes a DASD tray 24. The DASD tray 24 includes a DASD 18 and a regulator 16. As shown, the regulator 16 supplies power to the DASD 18. It is with the regulator 16 that the operating system 82 communicates via the bus 84.

During operation, the operating system instructs each regulator 16 as to whether the regulator 16 should supply power to an associated DASD 18. Also during operation, the initiator 80 implements a communication protocol by which data is transferred to and from the DASD array 86.

Because of the serial arrangement of the DASD array 86, if a DASD tray 24 is not present in a DASD slot 88, the communication path is broken. In order to maintain the communication path when a DASD tray 24 is not present, an operator must insert a dummy DASD tray in the empty DASD slot 88. The dummy DASD tray is merely a connector or jumper which serves to connect the previous DASD slot 88 with the succeeding DASD slot 88. Additionally, if a DASD 18 is to be added to the DASD array 86, user intervention is required to maintain a properly connected loop or communication path.

If a DASD 18 should malfunction, then the communication path or loop is broken. Using the communication protocol, the initiator 80 establishes which of the DASD slots 88 contains the malfunctioning DASD 18. The operating system 82 then causes the regulator 16 associated with the malfunctioning DASD 18 to power down the malfunctioning DASD 18, and the operating system 82 communicates this information to a user. A user must then remove the DASD tray 24 containing the malfunctioning DASD 18, and replace the DASD tray 24 with a dummy DASD tray or a new DASD tray 24. Only then is the communication path reconnected and normal un-degraded SCSI operation resumed.

SUMMARY OF THE INVENTION

An object of the present invention is to provide a communication system for an array of DASD which does not require user intervention to bypass single and/or multiple DASD slots.

Another object of the present invention is to provide a communication system for an array of DASD which selectively places a second initiator within the communication path.

A further object of the present invention is to provide a notification system such that the addition or removal of a DASD from the communication path can be determined.

A further object of the present invention is to provide a communication array of DASD which is compatible with upcoming fiber channel arbitrated loop or FC-AL architecture and the derivative thereof called FC-EL.

These and other objects are achieved by providing a communication system for an array of DASD which includes a plurality of loop resiliency circuits and a plurality of selection circuits. The DASD array includes a plurality of DASD slots. Each DASD slot may receive a DASD, and each DASD receives power from a regulator.

The loop resiliency circuits form at least a first communication path. Each loop resiliency circuit is associated with one of the DASD slots and selectively includes the associated DASD slot in the first communication path based on a selection signal. The plurality of selection circuits are also associated with one of the DASD slots; and therefore, are also associated with one of the plurality of loop resiliency circuits. Each selection circuit is connected to the associated DASD slot and receives output from the regulator in the associated DASD slot. Based on the regulator output, or a lack thereof, the selection circuit generates a selection signal for the associated loop resiliency circuit.

Besides being serially connected to form a single communication path, the loop resiliency circuits can be divided into groups wherein the loop resiliency circuits in each group are serially connected to form a communication path. Separate loop resiliency circuits then selectively connect these communication paths to a main communication path including an initiator. As a further alternative, a second initiator can be selectively placed in one of the communication paths via another loop resiliency circuit.

When a DASD is powered down, the regulator which was powering that DASD outputs an on/off signal indicating that the DASD has been powered off. In response to either the on/off signal or the lack of power to the DASD, the selection circuit outputs a selection signal which causes the associated loop resiliency circuit to exclude the DASD slot including the powered down DASD from the communication path. This selection signal, however, is generated a predetermined period of time after the DASD is powered down. Consequently, an open loop condition exists in the communication path containing the powered down DASD such that an initiator connected to the communication path can determine which DASD has been powered down. Once the selection signal to exclude the DASD has been received by the loop resiliency circuit, the communication path is reconnected without that DASD included therein.

Accordingly, the present invention does not require user intervention to bypass single and/or multiple DASD slots. User intervention is also not required to include a second initiator within a communication path.

Other objects, features and characteristics of the present invention; methods, operation, and functions of the related elements of the structure; combination of parts; and economies of manufacture will become apparent from the following detailed description of the preferred embodiments and accompanying drawings, all of which form a part of this specification, wherein like reference numerals designate corresponding parts in the various figures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

The communication system according to the present invention employs a plurality of loop resiliency circuits or LRCs to selectively include one or more DASD slots of a DASD array in a communication path. For an LRC which selectively includes a single DASD slot in a communication path, a delay-and-ground or DAG circuit controls the operation of the LRC based on the whether a regulator associated with a DASD in the DASD slot is supplying power to the DASD. An LRC which selectively includes a bank of DASD slots in a communication path operates based on whether any of the DASD slots in the bank of DASD have been included within a communication path of the bank of DASD.

Similarly, the communication system according to the present invention employs an LRC to selectively include a second initiator within the communication system. This LRC operates based on a signal from the added initiator indicating that the added initiator is present.

Figure 1:
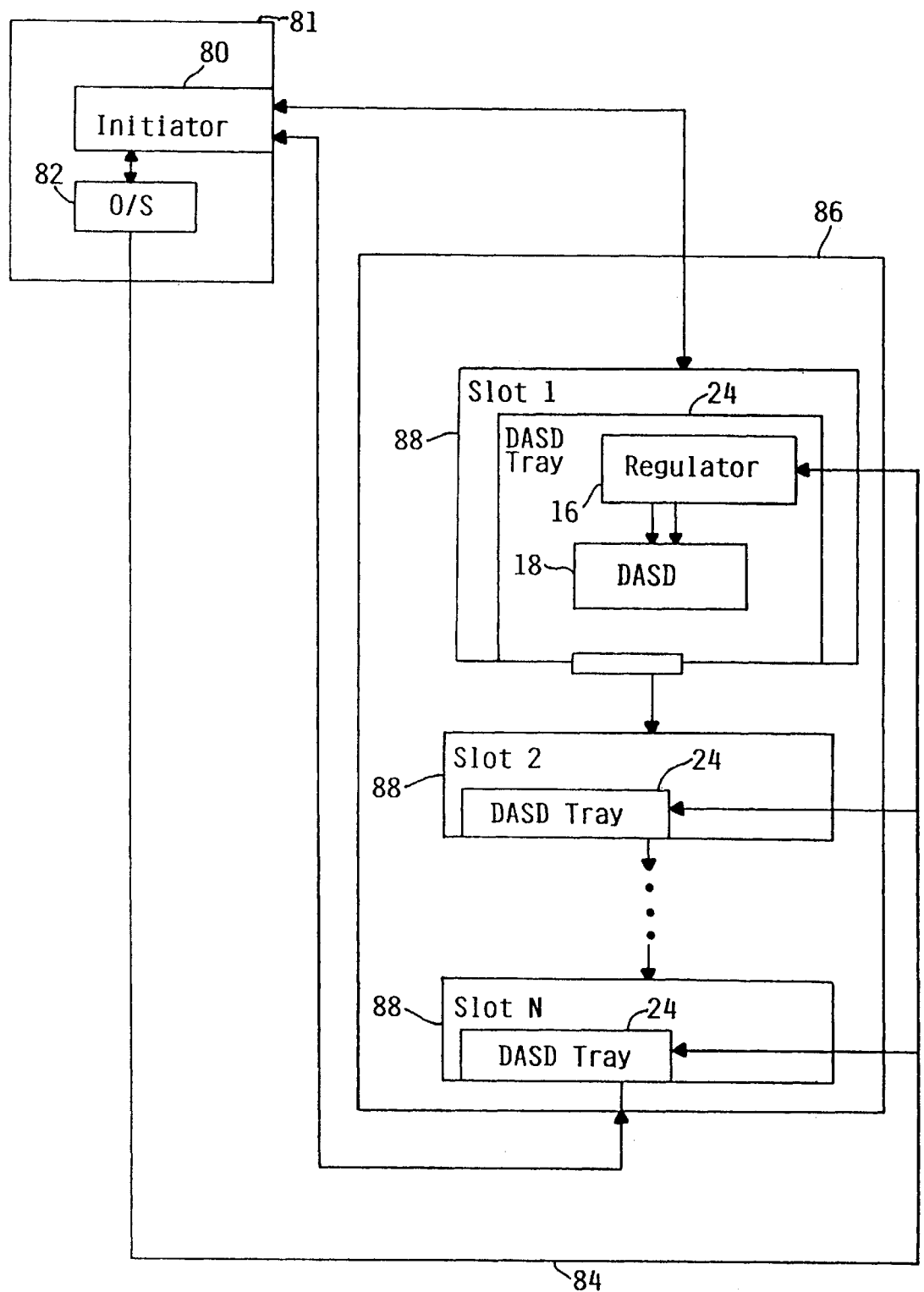
FIG. 1 illustrates a prior art communication system for an array of DASD.
Figure 2:
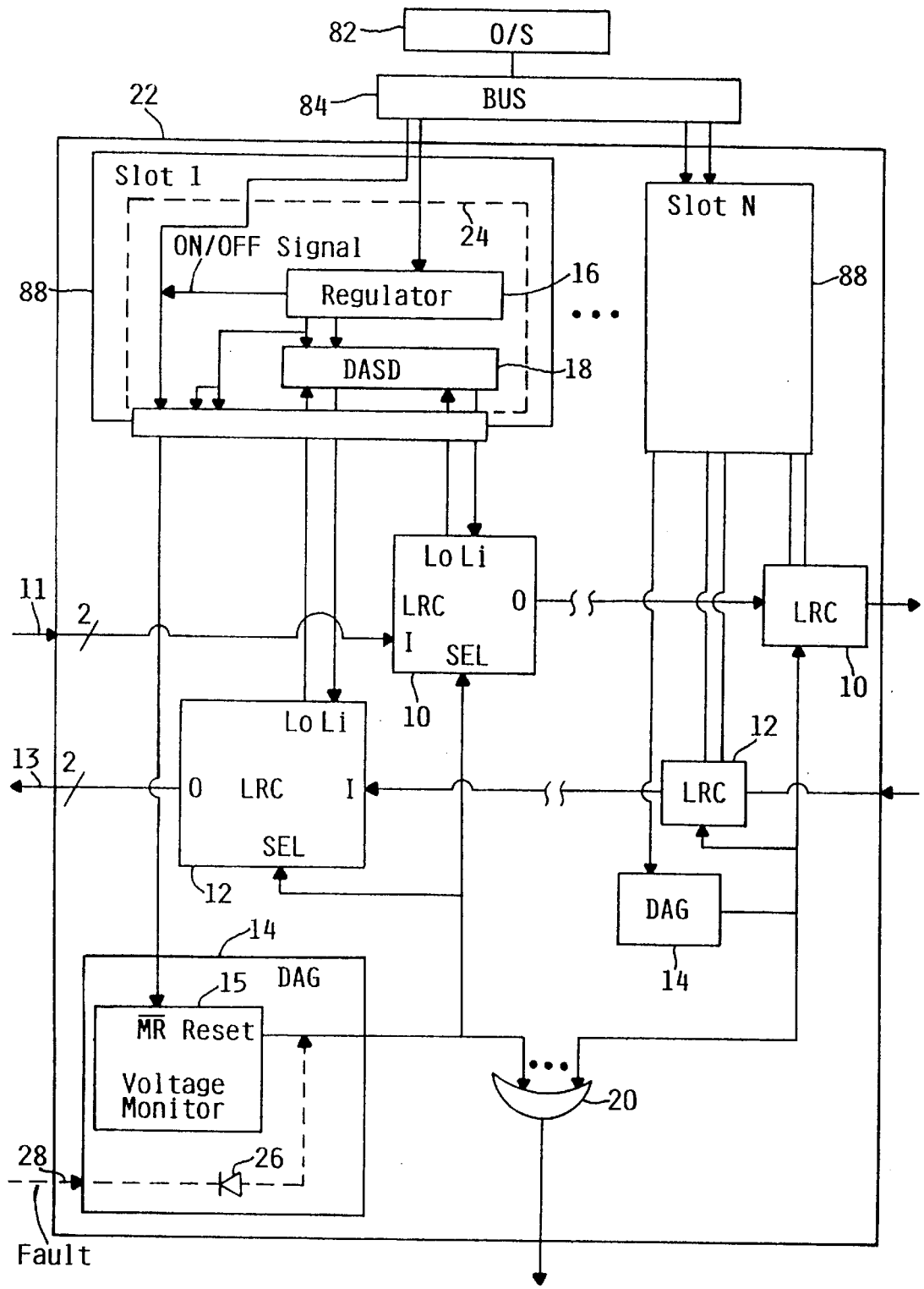
FIG. 2 illustrates a bank of N DASD in the communication system for an array of DASD according to the present invention.

FIG. 2 illustrates a bank of N DASD in a communication system for an array of DASD according to the present invention, and will be used to explain how the present invention selectively includes individual DASD slots in a communication path. As shown, a bank of N DASD 22 includes N DASD slots 88. Each DASD slot 88 can include a DASD tray 24 having a regulator 16 connected to an associated DASD 18. The regulator 16 supplies power to the DASD 18 and also receives an instruction from an operating system 82 of a main computer system via a bus 84.

As discussed in the Background of the Invention section, serial SCSI buses such as in SSA are normally wired in a loop configuration with a four wire full duplex cable. Accordingly, two communication paths, each comprised of two wires, form the SSA architecture. FIG. 2 illustrates a first communication path 11 and a second communication path 13. The first communication path 11 is formed by a first set of N serially connected LRCs 10 wherein each first set LRC 10 is associated with a DASD slot 88. Likewise, the second communication path 13 includes a second set of N serially connected LRCs 12 wherein each second set LRC 12 corresponds to a DASD slot 88. Each first set LRC 10 selectively includes the associated DASD slot 88 in the first communication path 11, while each second set LRC 12 selectively includes the associated DASD slot 88 in the second communication path 13.

Figure 3:
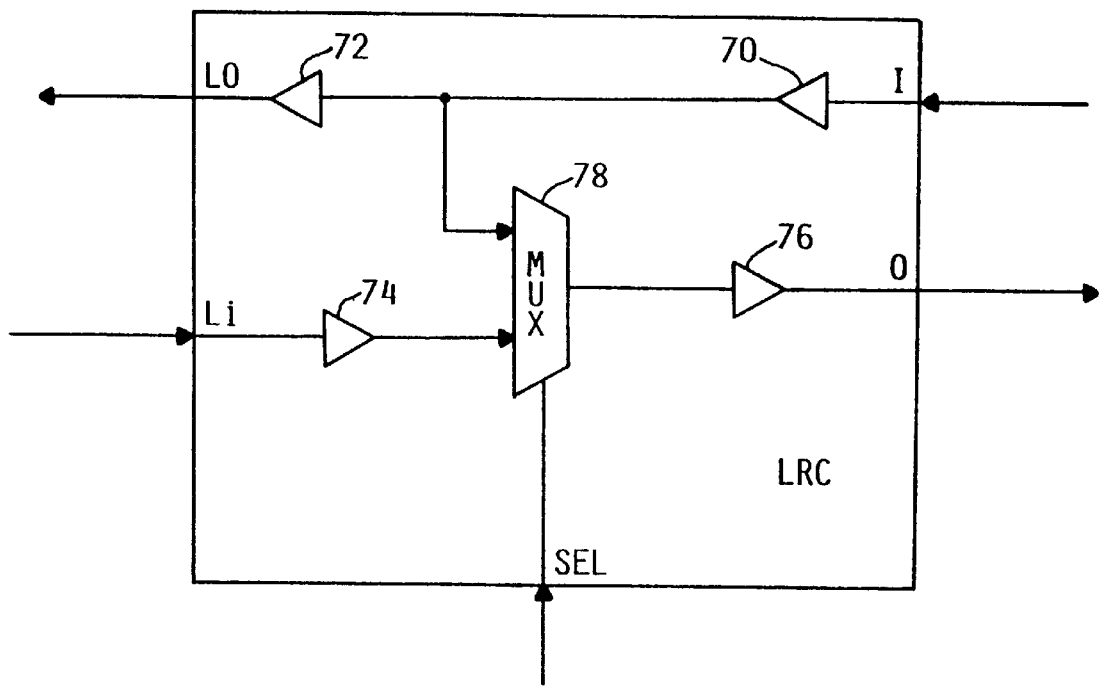
FIG. 3 illustrates the structure of a loop resiliency circuit.

FIG. 3 illustrates the structure of an LRC which in a preferred embodiment of the present invention is Motorola's fiber channel coaxial cable driver and loop resiliency circuit model no. MC10SX1189. As shown in FIG. 3, an LRC has an input I, an output O, a local input Li and a local output Lo. A first amplifier 70 drives a signal received at the input I, and outputs the driven input signal to a multiplexer 78 and a second amplifier 72. The output of the second amplifier 72 serves as the local output Lo of the LRC.

A third amplifier 74 receives the signal input at the local input Li, and outputs the local input signal to the multiplexer 78. Based on a selection signal, the multiplexer 78 outputs either the input signal received from the first amplifier 70 or the local input signal received from the third amplifier 74. The output of the multiplexer 78 is received by a fourth amplifier 76, and the output of the fourth amplifier 76 is sent to the output O of the LRC.

During operation, structural elements connected between the local output Lo and local input Li of the LRC will be bypassed when the multiplexer 78 selects the output of the first amplifier 70 in response to a selection signal. Consequently, structure connected between the local output Lo and the local input Li will not form a part of the communication path to which the input I and the output O of the LRC belong. But, if the multiplexer 78 selects the output of the third amplifier 74 in response to a selection signal, then structure connected between the local output Lo and the local input Li of the LRC will be included within the communication path or loop to which the input I and the output O belong.

Returning to FIG. 2, the bank of N DASD 22 also includes a DAG circuit 14 associated with each DASD slot 88. Each DAG circuit 14 includes a voltage monitor 15. The voltage monitor 15 is connected to the associated DASD slot 88 such that the voltage monitor 15 receives the on/off signal that is low when the regulator 16 is supplying power and high otherwise. In a preferred embodiment of the present invention, the voltage monitor 15 is the MAX812TEUS-T voltage monitor sold by Maxim. As shown in FIG. 2, the MR input of the voltage monitor 15 receives the on/off signal, and the reset output of the voltage monitor 15 serves at the output of the DAG circuit 14.

As is well known, when the regulator 16 is supplying power to the DASD 18, the regulator 16 outputs an on/off signal having a logic low value. When the regulator 16 is not supplying power to the DASD 18, a logic high signal is supplied to the MR input. As is also well known, when the signal input by the MR input of the voltage monitor 15 transitions from logic high to logic low, the reset output of the voltage monitor 15 transitions to a logic high value. When, however, the signal input by the MR input transitions from logic low to logic high, the reset output of the voltage monitor remains at a logic high level for a predetermined period of time, and then transitions to a logic low value.

Alternatively, or in addition to the voltage monitor 15, the DAG circuits 14 of the bank of N DASD 22 can include, as shown by the dash line, a fault line 28.

Each DAG circuit 14 includes a diode 26 placed along the fault line 28, with the output of the diode 26 being connected to the output of the DAG circuit 14. When the fault line 28 is asserted, the output of the DAG circuit 14 transitions to logic low immediately. While the fault line 28 is not necessary for an SSA architecture, the fault line 28 does provide compatibility with the FC-AL or FC-EL architectures.

The output of the DAG circuit 14 supplies the selection signal for the second set LRC 12 and the first set LRC 10 associated with the same DASD slot 88 as the DAG circuit 14. Also, an OR circuit 20 receives the output of each DAG circuit 14 in the bank of N DASD 22, and the output of the OR circuit 20 serves as a group selection signal for the bank of N DASD 22 as described in greater detail below.

The operation of the bank of N DASD 22 will now be described. As discussed above, a DASD slot 88 is connected between the local output Lo and local input Li of both the first set LRC 10 and the second set LRC 12 associated therewith. Consequently, when the DAG circuit 14 outputs a logic high selection signal, an include selection signal, the associated DASD slot 88 is included in both the first communication path 11 and the second communication path 13. By contrast, if the DAG circuit 14 outputs a logic low selection signal, an exclude selection signal, the first and second set LRCs 10 and 12 bypass the associated DASD 88; thus, excluding the associated DASD slot 88 from the first communication path 11 and the second communication path 13.

During operation, the operating system 82 receives information via the bus 84 on which DASD slot 88 includes a DASD tray 24, instructs each regulator 16 to supply power to the associated DASD 18. At this time, the regulator 16 will output an on/off selection signal indicating that power is being supplied to the DASD 18. As discussed above, the DAG circuit 14 outputs an include selection signal in response to the on/off signal such that the DASD slot 88 is included in the first and second communication paths 11 and 13 by the first and second set LRCs 10 and 12, respectively.

If, subsequently, the DASD 18 should malfunction, then the operating system 82 instructs the regulator 16, via the bus 84, to power down the DASD 18. Alternatively, the operating system 82 notifies an operator of the malfunctioning DASD 18, and instructs the regulator 16 to power down the malfunctioning DASD 18 when commanded to do so by the operator. In either case, a logic high signal is supplied to the voltage monitor 15 indicating that power is not being supplied to the DASD 18. In response, the DAG circuit 14 will output an exclude selection signal such that the DASD slot 88 is now bypassed by the first and second set LRCs 10 and 12. The DAG circuit 14, however, only generates the exclude selection signal after a predetermined period of time. Consequently, an open loop or open communication path condition exists with respect to both the first communication path 11 and the second communication path 13. During this open loop condition, an initiator connected to the first and second communication paths 11 and 13 can determine that the DASD 18 in the DASD slot 88 has been taken off line. This functionality is particularly useful if an operator should remove a powered DASD 18 from a DASD slot 88, because the operating system 82 can determine which DASD 18 has been removed.

Also, if a DASD slot 88 does not include a DASD tray 24, then the logic high signal from the bus 84 is supplied to the DAG circuit 14; and consequently, the DAG circuit 14 generates an exclude selection signal such that the DASD slot 88 is bypassed by the associated first and second set LRCs 10 and 12.

Figure 5:
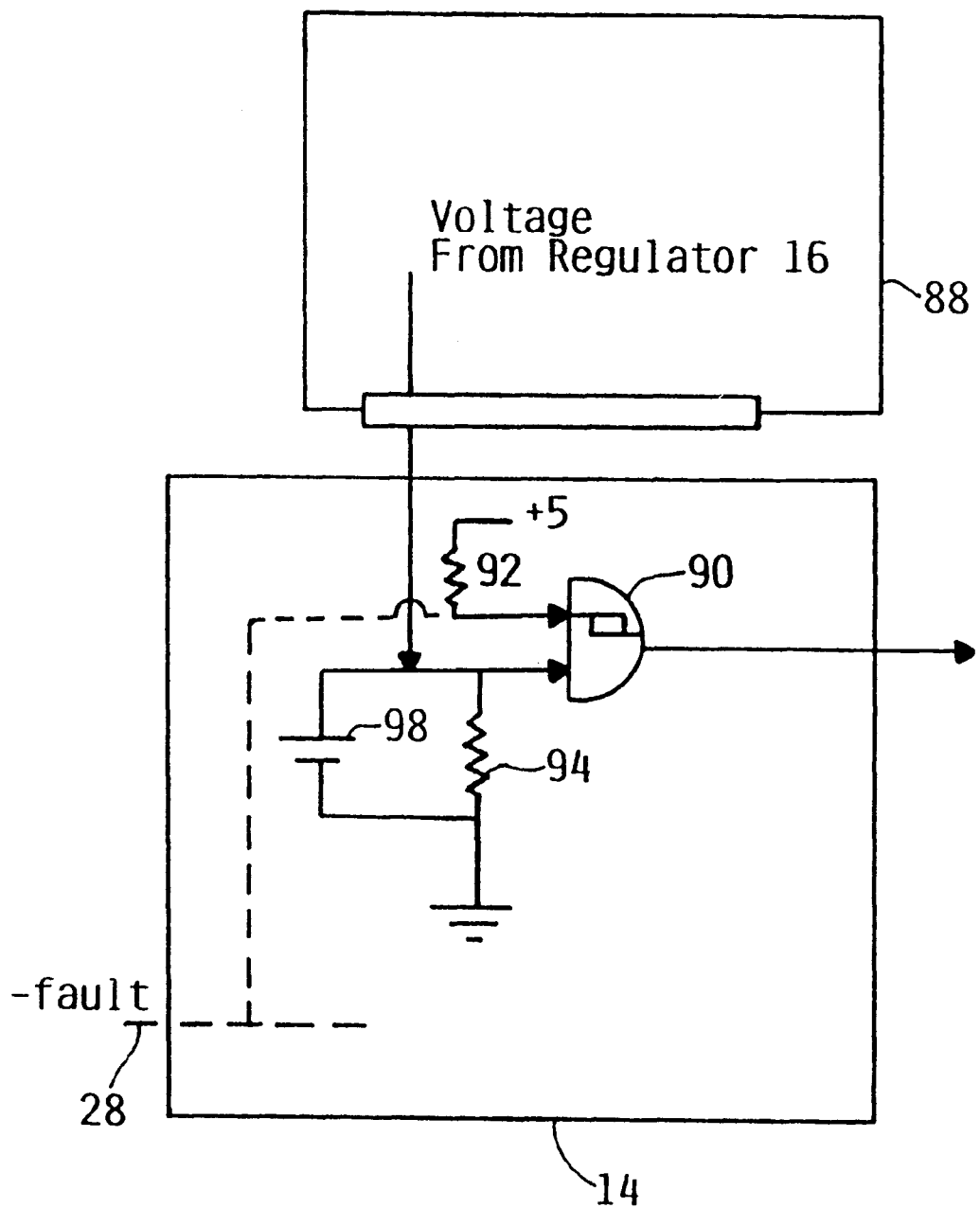
FIG. 5 illustrates an alternate embodiment of a delay-and-ground circuit used in the communication system according to the present invention.

FIG. 5 illustrates an alternative embodiment for the DAG circuit 14. Instead of receiving the on/off signal from the regulator 16, the DAG circuit 14 shown in FIG. 5 receives the 5 volt power supply voltage supplied to the DASD 18 by the regulator 16. The 5 volt 35 power supply voltage is received by the first input of an AND gate with hysteresis 90, while the second input of the AND gate 90 receives a separate 5 volt signal via a first resistor 92. The first input of the AND gate 90 also has a capacitor 98 and a second resistor 94 connected in parallel thereto. As with the voltage monitor implementation of the DAG circuit 14, this circuit implementation of the DAG circuit 14 supplies an include selection signal for a predetermined period of time after power is no longer supplied to the DASD 18 by the regulator 16. After the predetermined period of time, which is established by the capacitor 98 and the second resistor 92, has expired, an exclude selection signal is generated. Also, the DAG circuit 14 of FIG. 5 includes the fault line 28 directly connected to the first input of the AND gate 90.

Figure 4:
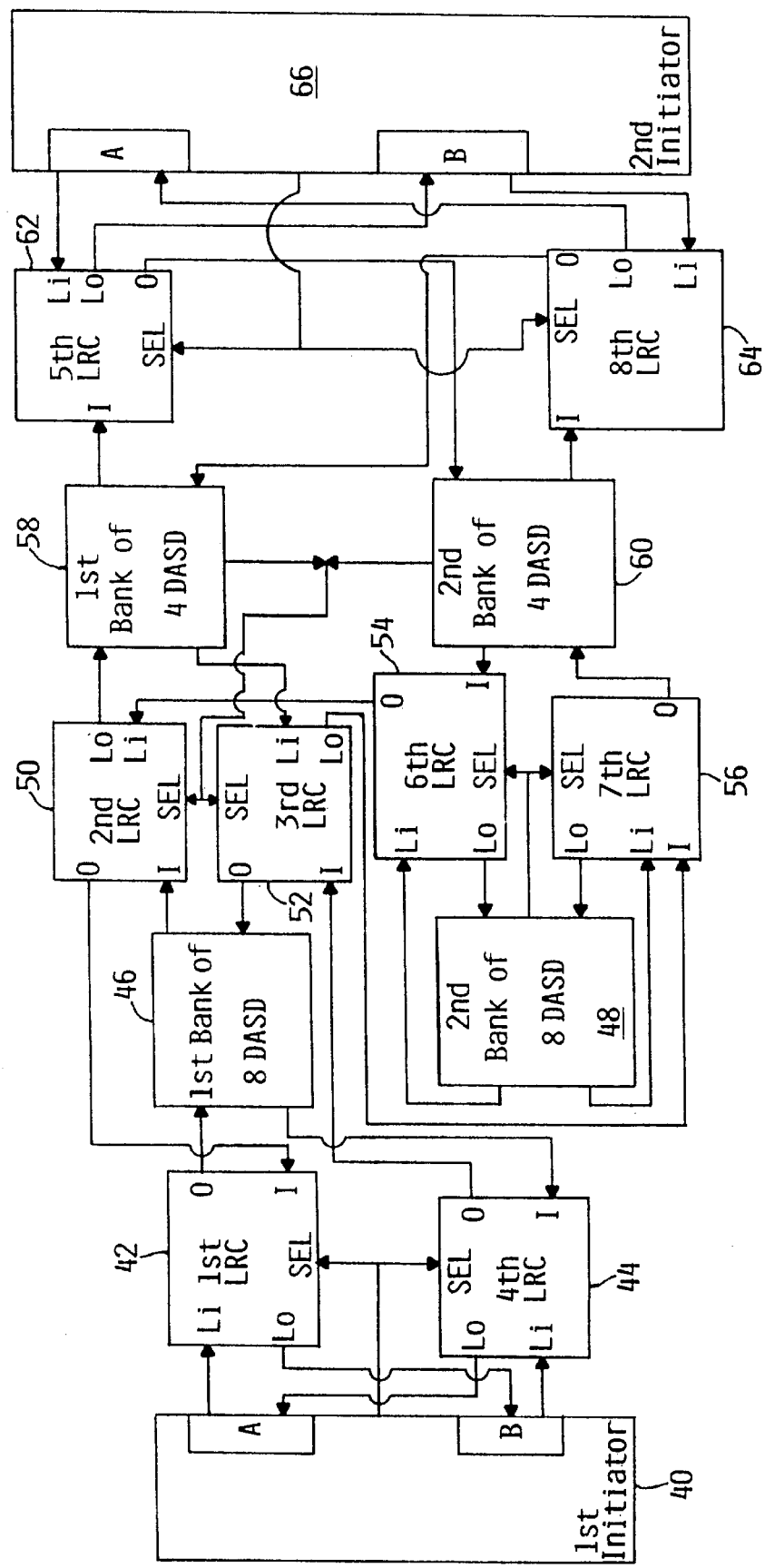
FIG. 4 illustrates one embodiment of a communication system for an array of DASD according to the present invention.

FIG. 4 illustrates a communication system for an array of DASD according to the present invention, and will be used to explain how the present invention selectively includes a bank of DASD and a second initiator in a communication path. For ease of illustration, the operating system 82 and the connections between each bank of DASD and the operating system 82 have not been shown. As shown, the communication system includes a first initiator 40 having a port A and a port B. As is well known, initiators typically have four ports A, B, C, and D. For ease of illustration, ports C and D have not been shown. It should be understood, however, that the communication system according to the present invention discussed with respect to ports A and B equally applies to ports C and D.

Port A of the first initiator 40 is connected to the local input Li of a first LRC 42, and port B of the first initiator 40 is connected to the local output Lo of the first LRC 42. The output O of the first LRC 42 is connected to the first communication path 11 of a first bank of eight DASD 46. Each bank of DASD discussed with respect to FIG. 4 has the same structure as shown in FIG. 2 except that the number of DASD has been specified for purposes of discussion.

The first communication path 11 of the first bank of eight DASD 46 is also connected to the input I of a second LRC 50, while the second communication path 13 of the first bank of eight DASD is connected between the output O of a third LRC 52 and the input I of a fourth LRC 44. The fourth LRC 44 has its local output Lo and local input Li connected to ports A and B, respectively, of the first initiator 40, and has its output O connected to the input I of the third LRC 52.

The output O of the second LRC 50 is connected to the input I of the first LRC 42, and the local output Lo of the second LRC 50 is connected to the first communication path 11 of a first bank of four DASD 58. The first communication path 11 of the first bank of four DASD 58 is also connected to the input I of a fifth LRC 62. The fifth LRC 62 has its local output Lo connected to port B of a second initiator 66, and has its local input Li connected to port A of the second initiator 66. The output O of the fifth LRC 62 is connected to the first communication path 11 of a second bank of four DASD 60. The first communication path 11 of the second bank of four DASD 60 is also connected to the input I of a sixth LRC 54. Connected between the local output Lo and the local input Li of the sixth LRC 54 is the first communication path 11 of a second bank of eight DASD 48. The output O of the sixth LRC 54 is connected to the local input Li of the second LRC 50.

Returning to the third LRC 52, the third LRC 52 has its local output Lo connected to the input I of a seventh LRC 56. Connected between the local output Lo and local input Li of the seventh LRC 56 is the second communication path 13 of the second bank of eight DASD 48. The seventh LRC 56 has its output O connected to the second communication path 13 of the second bank of four DASD 60. The second communication path 13 of the second bank of four DASD 60 is also connected to the input I of an eighth LRC 64.

The local output Lo of the eighth LRC 64 is connected to port A of the second initiator 66, while the local input Li of the eighth LRC 64 is connected to port B of the second initiator 66. The output O of the eighth LRC 64 is connected to the second communication path 13 of the first bank of four DASD 58. The second communication path 13 of the first bank of four DASD 58 is also connected to the local input Li of the third LRC 52.

The first initiator 40 supplies the selection signal to the first LRC 42 and the fourth LRC 44. The group selection signals output by OR gate 20 in the first bank of four DASD 58 and the second bank of four DASD 60 are supplied as the selection signals to both the second LRC 50 and the third LRC 52. The group selection signal output by the OR gate 20 of the second bank of eight DASD 48 is supplied to the selection input of both the sixth LRC 54 and the seventh LRC 56. Also, the second initiator 66 supplies the selection signal to both the fifth LRC 62 and the eighth LRC 64.

The operation of the communication system illustrated in FIG. 4 will now be described. When the communication system illustrated in FIG. 4 is connected to the first initiator 40, the first initiator 40 supplies a selection signal to the first LRC 42 and the fourth LRC 44 such that the first initiator 40 is included within a communication path to which the output O and the input I of both the first LRC 42 and fourth LRC 44 belong. Consequently, a first signal output from port A of the first initiator 40 is received by the local input Li of the first LRC 42, and output by the first LRC 42 to the first bank of eight DASD 46. The first signal from port A then travels along the first communication path 11 of the first bank of eight DASD 46, and is received by the input I of the second LRC 50.

If neither the first bank of four DASD 58 nor the second bank of four DASD 60 includes a DASD tray 24 in a DASD slot 88, then the group selection signal output by both the first bank of four DASD 58 and the second bank of four DASD 60 will be an exclude group selection signal. Consequently, the first signal received at the input I of the second LRC 50 bypasses the structure connected between the local output Lo and local input Li of the second LRC 50, and is output to the input I of the first LRC 42. Because an include group selection signal is received from the initiator 40 by the first LRC 42, the first signal is output by the first LRC 42 to port B of the first initiator 40. Accordingly, the communication path of the first signal is completed.

If, however, one of the DASD slots 88 in the first bank of four DASD 58 and second bank of four DASD 60 includes a DASD tray 24, then the group selection signal from one of the first bank of four DASD 58 and the second bank of four DASD 60 will be an include group selection signal. In this instance, the first signal received at the input I of the second LRC 50 will be output at the local output Lo of the second LRC 50. Thus, the first signal is transmitted to the first communication path 11 of the first bank of four DASD 58, and then supplied to the input I of the fifth LRC 62.

If the second initiator 66 has not been connected to the communication system, then the first signal is output at output O of the fifth LRC 62, and received by the first communication path 11 of the second bank of four DASD 60. Alternatively, if the second initiator 66 has been connected to the communication system shown in FIG. 4, then the first signal is output at the local output Lo of the fifth LRC 62, and received by port B of the second initiator 66.

The second initiator 66 outputs a second signal from port A which is received by the local input Li of the fifth LRC 62. The second signal is then output at output O of the fifth LRC 62, and received by the first communication path 11 of the second bank of four DASD 60. For purposes of discussion, it will be assumed that the second initiator 66 has not been connected to the communication system; and therefore, the first signal will continue to be referred to in discussing the operation of the communication system shown in FIG. 4. It should be understood, however, that the following discussion with respect to the first signal equally applies to the second signal output from port B of the second initiator 66.

The input I of the sixth LRC 54 receives the first signal from the first communication path 11 of the second bank of four DASD 60. If one of the DASD slots 88 in the second bank of eight DASD 48 includes a DASD tray 24, then the second bank of eight DASD 48 outputs an include group selection signal. In response, the sixth LRC 54 outputs the first signal to the second bank of eight DASD 48 via its local output Lo. The first signal then returns to the local input Li of the sixth LRC 54 via the first communication path 11 of the second bank of eight DASD 48. The output O of the sixth LRC 54 outputs the first signal to the local input Li of the second LRC 50. Alternatively, if none of the DASD slots 88 includes a DASD tray 24, the second bank of eight DASD 48 outputs an exclude group selection signal such that the first signal received at the input I of the sixth LRC 54 bypasses the second bank of eight DASD 48, and is directly output to the local input Li of the second LRC 50.

As discussed above, the first signal then returns to port B of the first initiator 40 via the output O of the second LRC 50, the input I of the first LRC 42, and the local output Lo of the first LRC 42.

A second main communication path of the communication system shown in FIG. 4 will now be described. This second main communication path will be discussed with respect to a third signal output by port B of the first initiator 40. This third signal is received by the local input Li of the fourth LRC 44 and output by the output O of the fourth LRC 44, to the input I of the third LRC 52. If none of the DASD slots 88 in the first bank of four DASD 58 and the second bank of four DASD 60 include a DASD tray 24, then the group selection signals output by both the first bank of four DASD 58 and the second bank of four DASD 60 are exclude group selection signals. The third LRC 52 will cause the third signal to bypass any structure connected between its local output Lo and local input Li. Therefore, the third signal is output at output O of the third LRC 52 to the second communication path 13 of the first bank of eight DASD 46. The third signal is then sent to the input I of the fourth LRC 44, and output to port A of the first initiator 40 via the local output LO of the fourth LRC 44.

If, however, one of the DASD slots 88 of the first bank of four DASD 58 and the second bank of four DASD 60 includes a DASD tray 24, then one of the first bank of four DASD 58 and the second bank of four DASD 60 generates an include group selection signal. In response to the include group selection signal, the third signal is output at the local output Lo of the third LRC 52, and received at the input I of the seventh LRC 56.

If one of the DASD slots 88 of the second bank of eight DASD 48 includes a DASD tray 24, then the second bank of eight DASD 48 outputs an include group selection signal. In response to the include selection signal, the seventh LRC 56 outputs the third signal at its local output Lo to the second communication path 13 of the second bank of eight DASD 48. The third signal then returns via the second communication path 13 of the second bank of eight DASD 48 to the local input Li of the seventh LRC 56. The seventh LRC 56 outputs the third signal at its output O to the second communication path 13 of the second bank of four DASD 60.

Alternatively, if none of the DASD slots 88 of the second bank of eight DASD 48 includes a DASD tray 24, then the second bank of eight DASD 48 generates an exclude group selection signal. In response to the exclude group selection signal, the third signal received at the input I of the seventh LRC 56 is directly output at the output O of the seventh LRC 56; thus, bypassing the second bank of eight DASD 48. The third signal received by the second communication path 13 of the second bank of four DASD 60 is sent to the input I of the eighth LRC 64. If the second initiator 66 is connected to the communication system, then an include selection signal is received by the eighth LRC 64. In response to the include selection signal, the eighth LRC 64 outputs the third signal to port A of the second initiator 66 via the local output Lo.

The second initiator 66 outputs a fourth signal from port B which is received at the local input Li of the eighth LRC 64. The fourth signal is then output at output O of the eighth LRC 64 to the second communication path 13 of the first bank of four DASD 58. Alternatively, if the second initiator 66 is not connected to the communication system, then the third signal received at the input I of the eighth LRC 64 is output at the output O of the eighth LRC 64 to the second communication path 13 of the first bank of four DASD 58. The remainder of the operation of the communication system of FIG. 4 will be discussed with respect to the third signal. It should be understood, however, that the following discussion with respect to the third signal equally applies to the fourth signal if the second initiator 66 is connected to the communication system.

The third signal received by the second communication path 13 of the first bank of four DASD 58 is supplied to the local input Li of the third LRC 52. As discussed in detail above, the third signal is then transmitted to port A of the first initiator 40 via the output O of the third LRC 52, the second communication path 13 of the first bank of eight DASD 46, the input I of the fourth LRC 44, and the local output Lo of the fourth LRC 44. Accordingly, the second main communication path is complete.

As the above discussion demonstrates, individual DASD within a bank of DASD can be selectively included within or excluded from a communication path. Consequently, when a DASD is missing from a DASD slot or malfunctions, the DASD can be excluded from the communication path without operator intervention. In addition, because the communication path is maintained in an open state for a predetermined period of time by the DAG circuit, the initiator is alerted as to which DASD has gone down or has been removed. Furthermore, by using the operating system, DASD included in DASD slots can be selectively powered up and powered down; and consequently, included and excluded from a communication path.

In addition to being able to selectively include individual DASD in a communication path, the communication system of the present invention also provides for selectively including a bank of DASD in a communication path. The communication system according to the present invention can further selectively include a second initiator in a communication path. Again, the exclusion or inclusion of a bank of DASD or a second initiator is accomplished without user intervention.

An additional advantage of the present invention is the compatibility of the communication system of the present invention with architecture standards such as FC-AL and future architecture standards such as FC-EL.

Furthermore, it should be understood that FIG. 4 is but one possible arrangement of a communication system according to the present invention which illustrates the many advantages of the present invention. Clearly, numerous arrangements exist which fall within the scope of the present invention.

While the invention has been described in connection with what is presently considered the most practical and preferred embodiments, it is to be understood that the invention is not limited to the disclosed embodiments, but on the contrary, is intended to cover various modifications and equivalent arrangements included within the spirit and scope of the appended claims.

What is claimed:

1. A communication or DASD system for an array of direct access storage devices or DASD, the array including a plurality of DASD slots, each DASD slot for receiving a DASD and each DASD receiving power from an associated regulator, the system comprising:

a plurality of loop resiliency circuits forming at least a first communication path, each loop resiliency circuit associated with one of the DASD slots and selectively including the associated DASD slot in the first communication path based on a selection signal;

a plurality of local selection circuits, each selection circuit associated with one of the DASD slots and one of the plurality of loop resiliency circuits, each selection circuit connected to the associated DASD slot to receive output of a regulator if the associated DASD is in the associated DASD slot, and each selection circuit generating, without receipt of an external control signal, the selection signal based on one of the output from the regulator and a lack thereof, the output of the regulator indicating whether power is being supplied to the associated DASD.

2. The system of claim 1, wherein each selection circuit generates an include selection signal when the regulator output indicates that a DASD in the associated DASD slot is being supplied power, and generates an exclude selection signal when one of (i) the regulator output indicates that the DASD in the associated DASD slot is not being supplied power and (ii) the regulator output has not been received from the associated DASD slot; and each loop resiliency circuit includes the associated DASD slot in the first communication path when the include selection signal is received, and excludes the associated DASD slot from the first communication path when the exclude selection signal is received.

3. The system of claim 2, wherein each selection circuit delays generating the exclude selection signal for a predetermined period of time after power is cut to the DASD in the associated DASD slot.

4. The system of claim 3, wherein each of the plurality of selection circuits includes a voltage monitor.

5. The system of claim 1, wherein the plurality of selection circuits receive a power supply voltage which the regulator supplies the associated DASD as the regulator output.

6. The system of claim 1, further comprising:

a first initiator;

a second communication path beginning and terminating at the first initiator;

a first loop resiliency circuit included in the second communication path, and selectively including the first communication path in the second communication path based on a group selection signal.

7. The system of claim 6, further comprising:

a group selection signal generator receiving the selection signal generated by each selection circuit, generating an include group selection signal when at least one of the selection signals generated the plurality of selection circuits indicates to include a DASD slot in the first communication path, and generating an exclude group selection signal when none of the selection signals generated by the plurality of selection circuits indicates to include a DASD slot in the first communication path; and wherein the first loop resiliency circuit includes the first communication path in the second communication path when the include group selection signal is received, and excludes the first communication path from the second communication path when the exclude group selection signal is received.

8. The system of claim 6, further comprising:

a second initiator;

a second loop resiliency circuit included in the second communication path, and selectively including the second initiator in the second communication path based on an initiator selection signal received from the second initiator.

9. The system of claim 1, wherein the plurality of loop resiliency circuits are serially connected to form the first communication path.

10. The system of claim 1, wherein the plurality of loop resiliency circuits are divided into at least a first and second group, the loop resiliency circuits in the first group are serially connected to form the first communication path, and the loop resiliency circuits in the second group are serially connected to form a second communication path; and further including, a first initiator;

a third communication path beginning and terminating at the initiator;

a first loop resiliency circuit included in the third communication path, and selectively including the first communication path in the third communication path based on a first group selection signal.

a second loop resiliency circuit included in the third communication path, and selectively including the second communication path in the third communication path based on a second group selection signal.

11. The system of claim 10, further comprising:

a first group selection signal generator receiving the selection signals generated by a first group of the plurality of selection circuits and generating the first group selection signal based thereon, the first group of selection circuits being associated with the first group of loop resiliency circuits, the first group selection signal generator generating an include first group selection signal when at least one of the selection signals generated by the first group of selection circuits indicates to include the associated DASD slot in the first communication path, and generating an exclude first group selection signal when none of the selection signals generated by the first group of selection circuits indicates to include a DASD slot in the first communication path; and a second group selection signal generator receiving the selection signals generated by a second group of the plurality of selection circuits and generating the second group selection signal based thereon, the second group of selection circuits being associated with the second group of loop resiliency circuits, the second group selection signal generator generating an include second group selection signal when at least one of the selection signals generated by the second group of selection circuits indicates to include the associated DASD slot in the second communication path, and generating an exclude second group selection signal when none of the selection signals generated by the second group of selection circuits indicates to include the associated DASD slot in the second communication path; and wherein the first loop resiliency circuit includes the first communication path in the third communication path when the include first group selection signal is received, and excludes the first communication path from the third communication path when the exclude first group selection signal is received; and the second loop resiliency circuit includes the second communication path in the third communication path when the include second group selection signal is received, and excludes the second communication path from the third communication path when the exclude second group selection signal is received.

12. The system of claim 1, wherein the plurality of loop resiliency circuits are divided into at least a first and second group, the loop resiliency circuits in the first group are serially connected to form the first communication path, and the loop resiliency circuits in the second group are serially connected to form a second communication path; and further including, a first initiator;

a third communication path beginning and terminating at the initiator;

a first loop resiliency circuit serially connected to the second group of loop resiliency circuits to form at least part of a fourth communication path, and selectively including the first communication path in the fourth communication path based on a first group selection signal; and a second loop resiliency circuit included in the third communication path, and selectively including the fourth communication path in the third communication path based on a second group selection signal.

13. The system of claim 12, further comprising:

a first group selection signal generator receiving the selection signals generated by a first group of the plurality of selection circuits and generating the first group selection signal based thereon, the first group of selection circuits being associated with the first group of loop resiliency circuits, the first group selection signal generator generating an include first group selection signal when at least one of the selection signals generated by the first group of selection circuits indicates to include the associated DASD slot in the first communication path, and generating an exclude first group selection signal when none of the selection signals generated by the first group of selection circuits indicates to include the associated DASD slot in the first communication path; and a second group selection signal generator receiving the selection signals generated by a second group of the plurality of selection circuits and generating the second group selection signal based thereon, the second group of selection circuits being associated with the second group of loop resiliency circuits, the second group selection signal generator generating an include second group selection signal when at least one of the selection signals generated by the second group of selection circuits indicates to include the associated DASD slot in the second communication path, and generating an exclude second group selection signal when none of the selection signals generated the second group of selection circuits indicates to include the associated DASD slot in the second communication path; and wherein the first loop resiliency circuit includes the first communication path in the fourth communication path when the include first group selection signal is received, and excludes the first communication path from the fourth communication path when the exclude first group selection signal is received; and the second loop resiliency circuit includes the fourth communication path in the third communication path when the include second group selection signal is received, and excludes the fourth communication path from the third communication path when the exclude second group selection signal is received.

14. The system of claim 1, wherein the plurality of loop resiliency circuits are divided into at least a first and second group, the loop resiliency circuits in the first group are serially connected to form the first communication path, and the loop resiliency circuits in the second group are serially connected to form a second communication path; and further including, a first initiator;

a second initiator;

a third communication path beginning and terminating at the first initiator;

a fourth communication path at least including the first communication path, a first loop resiliency circuit, and the second communication path connected in series;

the first loop resiliency circuit selectively including the second initiator in the fourth communication path based on an initiator selection signal received from the second initiator; and a second loop resiliency circuit included in the third communication path, and selectively including the fourth communication path in the third communication path based on a first and second group selection signal.

15. The system of claim 14, further comprising:

a first group selection signal generator receiving the selection signals generated by a first group of the plurality of selection circuits and generating the first group selection signal based thereon, the first group of selection circuits being associated with the first group of loop resiliency circuits, the first group selection signal generator generating an include first group selection signal when at least one of the selection signals generated by the first group of selection circuits indicates to include the associated DASD slot in the first communication path, and generating an exclude first group selection signal when none of the selection signals generated by the first group of selection circuits indicates to include the associated DASD slot in the first communication path; and a second group selection signal generator receiving the selection signals generated by a second group of the plurality of selection circuits and generating the second group selection signal based thereon, the second group of selection circuits being associated with the second group of loop resiliency circuits, the second group selection signal generator generating an include second group selection signal when at least one of the selection signals generated by the second group of selection circuits indicates to include the associated DASD slot in the second communication path, and generating an exclude second group selection signal when none of the selection signals generated the second group of selection circuits indicates to include the associated DASD slot in the second communication path; and wherein the second loop resiliency circuit includes the fourth communication path in the third communication path when at least one of the include first and second group selection signals is received, and excludes the fourth communication path from the third communication path when both the exclude first and second group selection signals are received.

16. A communication system, comprising:

a first communication path;

a direct access storage device or DASD slot for receiving a DASD which receives power from a regulator;

a loop resiliency circuit, in the first communication path, selectively including the DASD slot in the first communication path based on a selection signal; and a local selection circuit connected to the DASD slot to receive output of the regulator if the DASD is in the DASD slot, the output of the regulator indicating whether power is being supplied to the DASD, and the selection circuit generating, without receipt of an external control signal, the selection signal based on one of the output from the regulator and a lack thereof.

17. A communication system, comprising:

a first communication path;

a bank of direct access storage device or DASD slots, each DASD slot for receiving a DASD, and each DASD receiving power from a regulator;

a loop resiliency circuit, in the first communication path, selectively including the bank of DASD slots in the first communication path based on a group selection signal;

a plurality of local selection circuits, each selection circuit associated with one of the DASD slots, connected to the associated DASD slot to receive output of a regulator if a DASD is in the associated DASD slot, and each selection circuit generating, without receipt of an external control signal, a selection signal based on one of the output from the regulator and a lack thereof, the output of the regulator indicating whether power is being supplied to the DASD; and a group selection signal generator generating the group selection signal based on the selection signals generated by the plurality of selection circuits.

* * * * *